(12) United States Patent
Umezawa et al.

(10) Patent No.: US 6,621,224 B2
(45) Date of Patent: Sep. 16, 2003

(54) LIGHT-CONTROLLING DEVICE USED FOR VEHICLE

(75) Inventors: Shigeyoshi Umezawa, Fukui (JP); Tsurugi Sawai, Hyogo (JP); Toshihiro Nomura, Fukui (JP); Yoshiyuki Nakade, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/264,385

(22) Filed: Oct. 4, 2002

(65) Prior Publication Data

US 2003/0085660 A1 May 8, 2003

(30) Foreign Application Priority Data

Oct. 4, 2001 (JP) ........................................ 2001-308306

(51) Int. Cl.[7] .............................................. H05B 37/00
(52) U.S. Cl. ...................... 315/82; 315/178; 315/159; 315/224; 307/10.8
(58) Field of Search .............................. 315/82, 77, 151, 315/158, 159, 178, 224; 307/10.8, 10.1

(56) References Cited

U.S. PATENT DOCUMENTS

| | | | | |
|---|---|---|---|---|
| 4,463,284 A | * | 7/1984 | Tamura et al. | 315/158 |
| 4,494,851 A | * | 1/1985 | Maida et al. | 396/163 |
| 6,320,330 B1 | * | 11/2001 | Haavisto et al. | 315/291 |
| 6,329,755 B1 | * | 12/2001 | Nakade et al. | 315/82 |

* cited by examiner

Primary Examiner—Don Wong
Assistant Examiner—Thuy Vinh Tran
(74) Attorney, Agent, or Firm—RatnerPrestia

(57) ABSTRACT

A light-controlling device of this invention includes a controlling circuit having a function for turning an incandescent lamp and an LED off simultaneously, which have different minimum voltages each other at predetermined illumination. When illumination of the lamp and the LED decrease to the predetermined illumination by rotating an operating section of a variable resistor, the controlling circuit turns the lamp and the LED off based on a signal from a detecting switch linked with rotating operation of the operating section. As a result, an operator does not feel strange.

3 Claims, 5 Drawing Sheets

LIGHT-CONTROLLING DEVICE USED FOR VEHICLE

FIELD OF THE INVENTION

The present invention relates to a light-controlling device used for controlling illumination of an indicator or an operating panel in a vehicle.

BACKGROUND OF THE INVENTION

A conventional light-controlling device illuminates an indicator or an operating panel using an incandescent lamp or a light emitting diode (LED). Operating a variable resistor changes an electric output of a controlling circuit, so that illumination of the incandescent lamp or the LED is controlled.

The conventional light-controlling device is described hereinafter with reference to FIGS. 8–10. FIG. 8 shows a circuit diagram of a conventional light-controlling device used for a vehicle. FIG. 9 shows an outward appearance of a dashboard in a vehicle. As shown in FIGS. 8 and 9, connecting terminal 1 of a power supply e.g., battery, is coupled with incandescent lamp 2 for illuminating indicator 3 and the like. Connecting terminal 1 is also coupled with diode 6 for suppressing surge. In addition, diode 6, fixed resistance 7 for controlling an electric current, and light emitting diode (LED) 4 for illuminating meter 5 such as a speed meter or a fuel meter are connected in series.

Controlling circuit 8, which generates voltage waveforms, is coupled with variable resistor 9 which is operated by rotating. Transistor 10 for controlling an electric current is coupled with controlling circuit 8, incandescent lamp 2 and LED 4.

FIG. 10 is a graph showing a characteristic of a resistance for an operating angle. A resistance value rate for an operating angle varies linearly as shown in characteristic R1 of FIG. 10.

When operating section 11 of variable resistor 9 rotates, an operating angle changes, thereby changing a resistance value rate. Then an output voltage from controlling circuit 8 changes, and an electric current through transistor 10 is controlled. As a result, illumination of incandescent lamp 2 and LED 4 change, and brightness of indicator 3 and meter 5 on a dashboard change.

However, when incandescent lamp 2 differs from LED 4 in characteristic, a minimum voltage of illuminating lamp 2 differs from that of LED 4 at predetermined illumination. In that case, when operating section 11 rotates for turning off, indicator 3 illuminated by lamp 2 and meter 5 illuminated by LED 4 are not turned off simultaneously. As a result, an operator feels strange.

SUMMARY OF THE INVENTION

The present invention aims to provide a light-controlling device, which is used for a vehicle and includes the following elements:

(a) a controlling circuit coupled with a plurality of light-emitting sections, which have minimum voltages different from each other at predetermined illumination,
(b) a variable resistor for changing illumination of the plurality of light-emitting sections by changing an electric output of the controlling circuit, where when the illumination of the plurality of light-emitting sections decreases to the predetermined illumination using the variable resistor, the controlling circuit turns the plurality of light-emitting sections off simultaneously based on a signal from a detecting section which is linked with the variable resistor.

DESCRIPTION OF THE PREFERRED EMBODIMENTS

Exemplary embodiments of the present invention are demonstrated hereinafter with reference to the accompanying drawings.

First Embodiment

Figure 1:
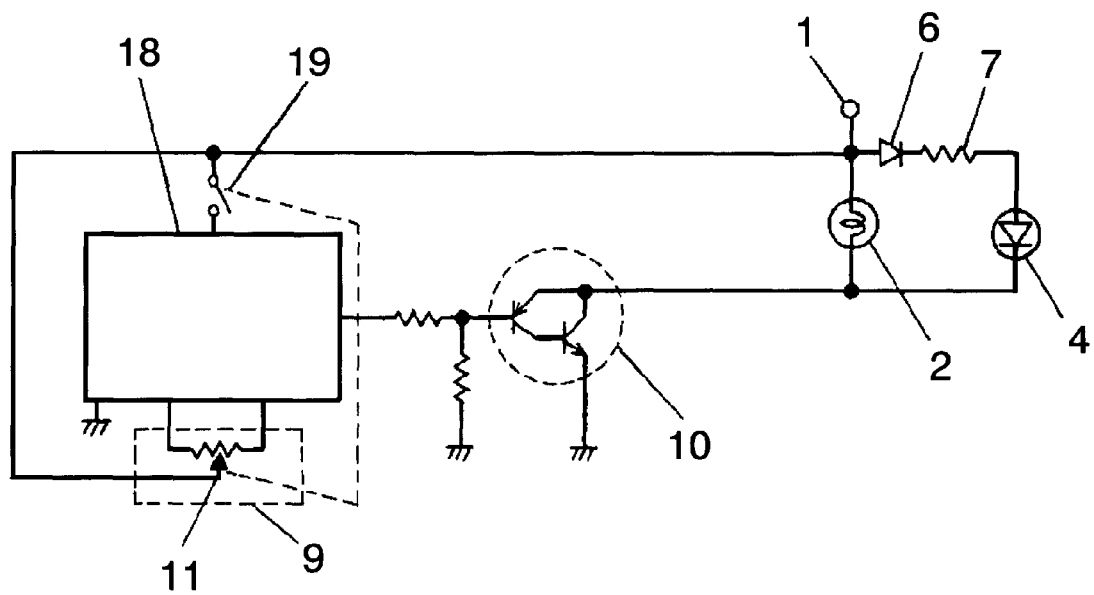
FIG. 1 shows a circuit diagram of a light-controlling device used for a vehicle in accordance with a first exemplary embodiment of the present invention.
Figure 9:
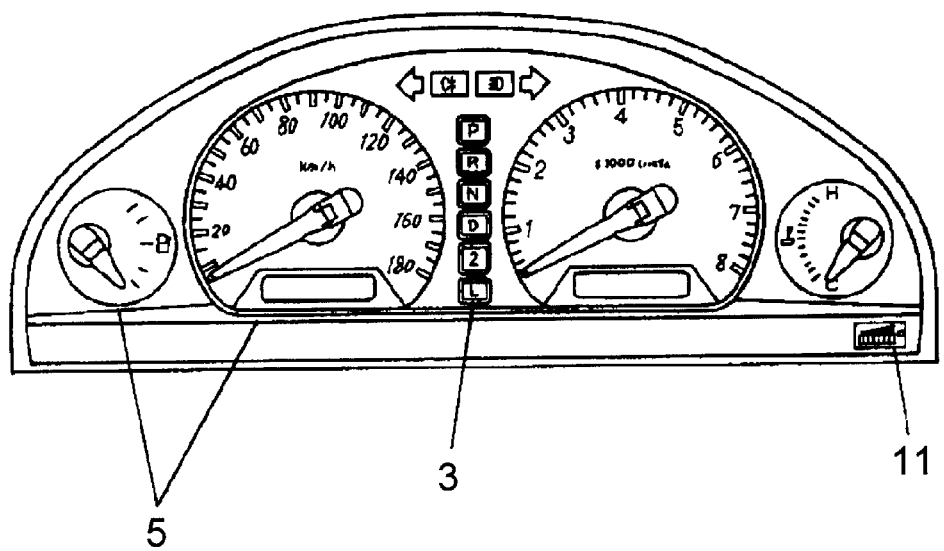
FIG. 9 shows an outward appearance of a dashboard in a vehicle.

FIG. 1 shows a circuit diagram of a light-controlling device used for a vehicle in accordance with the first exemplary embodiment of the present invention. FIG. 9 shows an outward appearance of a dashboard in a vehicle. As shown in FIGS. 1 and 9, connecting terminal 1 of a power supply e.g., battery, is coupled with incandescent lamp 2 for illuminating indicator 3 and the like. Connecting terminal 1 is also coupled with diode 6 for suppressing surge. In addition, diode 6, fixed resistance 7 for controlling an electric current, and light emitting diode (LED) 4 for illuminating meter 5 such as a speed meter or a fuel meter are connected in series.

Controlling circuit 18, which generates voltage waveforms, is coupled with variable resistor 9 which is operated by rotating. Transistor 10 for controlling an electric current is coupled with controlling circuit 18, incandescent lamp 2 and LED 4.

Figure 10:
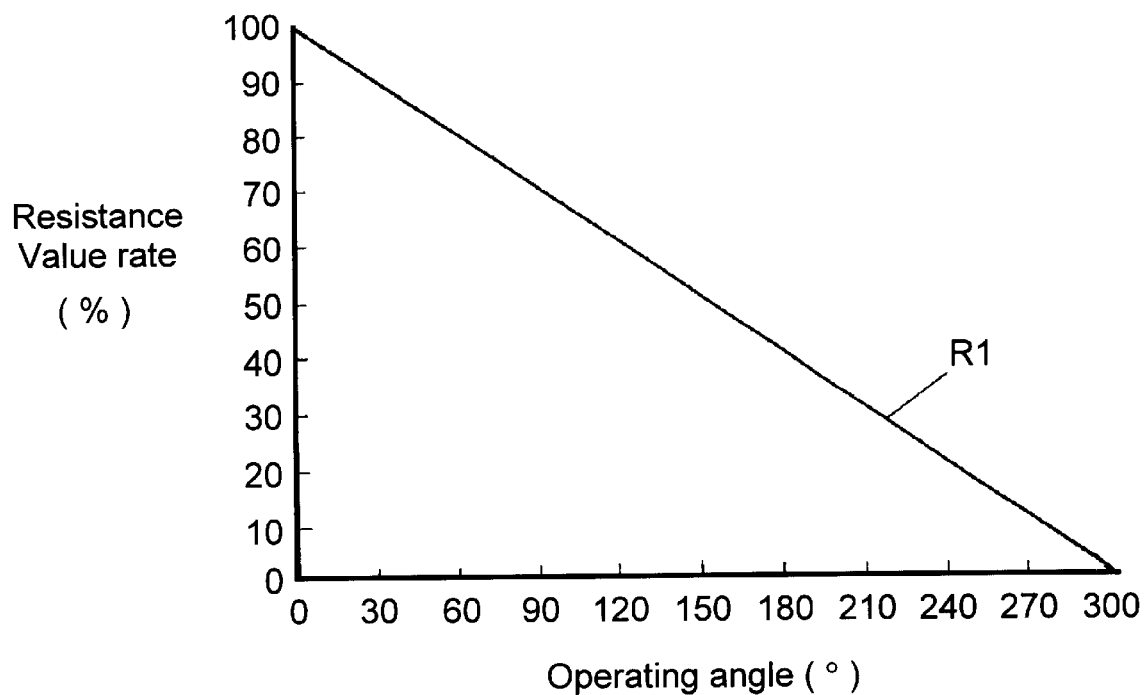
FIG. 10 is a graph showing a characteristic of a resistance for an operating angle.

FIG. 10 is a graph showing a characteristic of a resistance for an operating angle. A resistance value rate for an operating angle varies linearly as shown in characteristic R1 of FIG. 10. This characteristic is the same as conventional one.

When operating section 11 of variable resistor 9 rotates, an operating angle changes, thereby changing a resistance value rate. Then an output voltage from controlling circuit 18 changes, and an electric current through transistor 10 is controlled. As a result, illumination of incandescent lamp 2 and LED 4 change, and brightness of indicator 3 and meter 5 on a dashboard change. The operation discussed above is also the same as conventional one.

A feature of the light-controlling device of this invention is described hereinafter.

Figure 2:
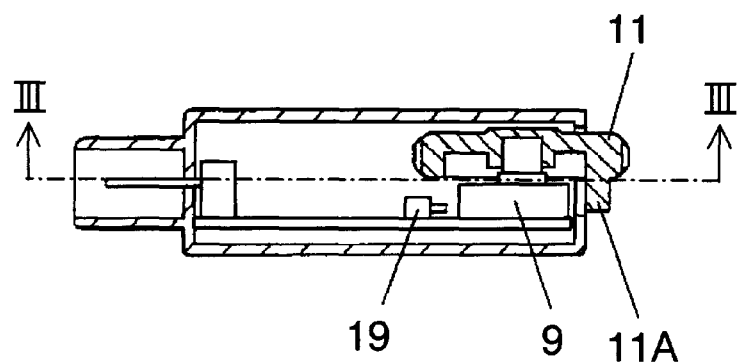
FIG. 2 shows a longitudinal sectional view of the light-controlling device in accordance with the first embodiment of the present invention.
Figure 3:
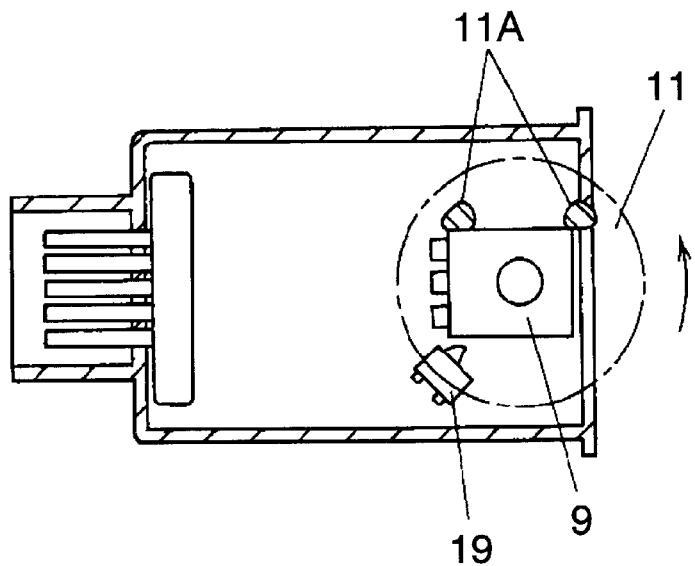
FIG. 3 shows a horizontal sectional view of FIG. 2 taken along the line III—III after an operating section is rotated counterclockwise.
Figure 4:
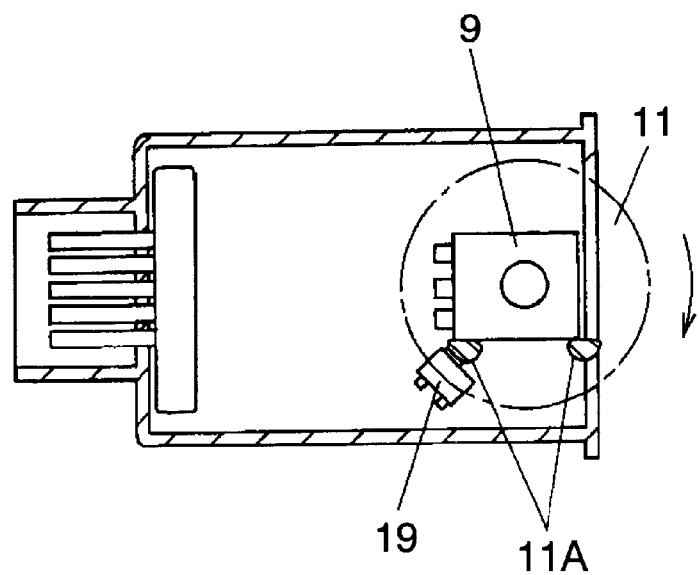
FIG. 4 shows a horizontal sectional view of FIG. 2 taken along the line III—III after the operating section is rotated clockwise.

FIG. 2 shows a longitudinal sectional view of the light-controlling device in accordance with the first embodiment of the present invention. FIG. 3 shows a horizontal sectional view of FIG. 2 taken along the line III—III after an operating section is rotated counterclockwise. FIG. 4 shows a horizontal sectional view of FIG. 2 taken along the line III—III after the operating section is rotated clockwise.

Detecting switch 19 is linked with rotating operation of operating section 11 of variable resistor 9, and detecting parts 11A is formed at operating section 11 of variable resistor 9. As shown in FIG. 4, when illumination of incandescent lamp 2 and LED 4 decreases to predetermined illumination by rotating section 11 of variable resistor 9 clockwise, detecting switch 19 detects detecting parts 11A and sends a signal, where detecting switch 19 and detecting parts 11A form a detecting section.

Controlling circuit 18 turns incandescent lamp 2 and LED 4 off simultaneously based on the signal from detecting switch 19 which is linked with rotating operation of operating section 11 of variable resistor 9.

As discussed above, the light-controlling device of this invention includes controlling circuit 18 having a function for turning a plurality of light-emitting sections such as incandescent lamp 2 or LED 4 off simultaneously, where the plurality of light-emitting sections have minimum voltages different from each other at predetermined illumination. When illumination of the plurality of light-emitting sections decreases to the predetermined illumination by rotating section 11 of variable resistor 9, controlling circuit 18 turns the light-emitting sections off simultaneously based on the signal from detecting switch 19 which is linked with rotating operation of operating section 11 of variable resistor 9.

Because indicator 3 illuminated by lamp 2 and meter 5 illuminated by LED 4 can be turned off simultaneously using the structure mentioned above, an operator does not feel strange.

In this embodiment, the detecting section is formed of detecting switch 19 and detecting parts 11A, which is formed at operating section 11 of variable resistor 9. However, a variable resistor including a switch, namely variable resistor 9 having detecting switch 19, can be used for the detecting section.

Second Embodiment

The second embodiment is demonstrated hereinafter with reference to the accompanying drawings. The elements similar to those described in the first embodiment have the same reference marks, and the descriptions of those elements are omitted here.

Figure 5:
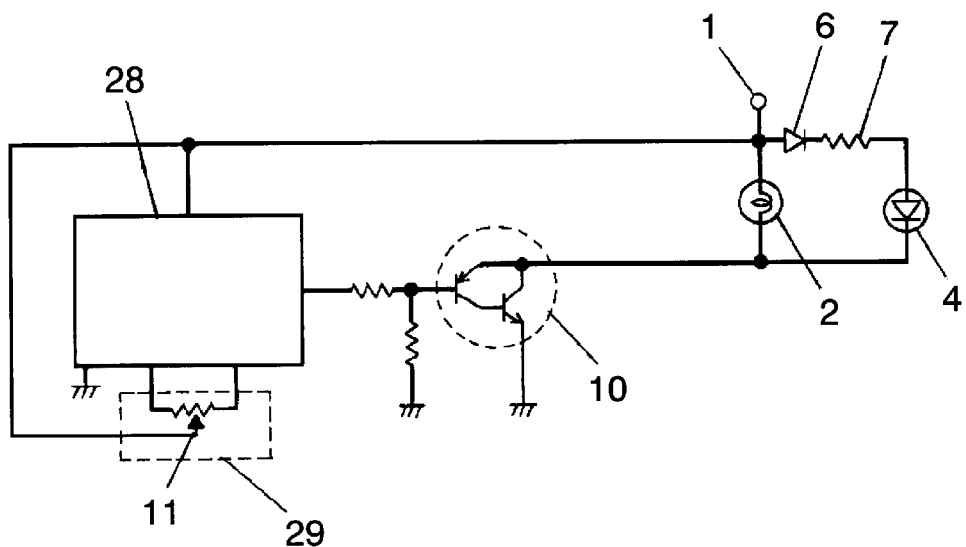
FIG. 5 shows a circuit diagram of a light-controlling device used for a vehicle in accordance with a second exemplary embodiment of the present invention.
Figure 6:
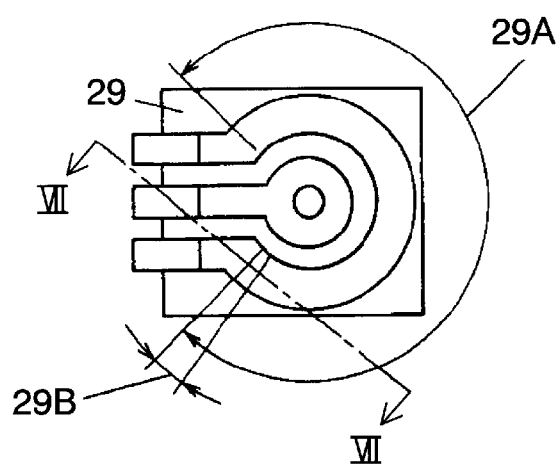
FIG. 6 shows a plan view of an essential part of the light-controlling device in accordance with the second embodiment of the present invention.
Figure 7:
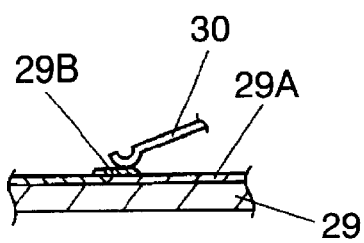
FIG. 7 shows a longitudinal sectional view of an essential part of the light-controlling device of FIG. 6 taken along the line VII—VII in accordance with the second embodiment of the present invention.
Figure 8:
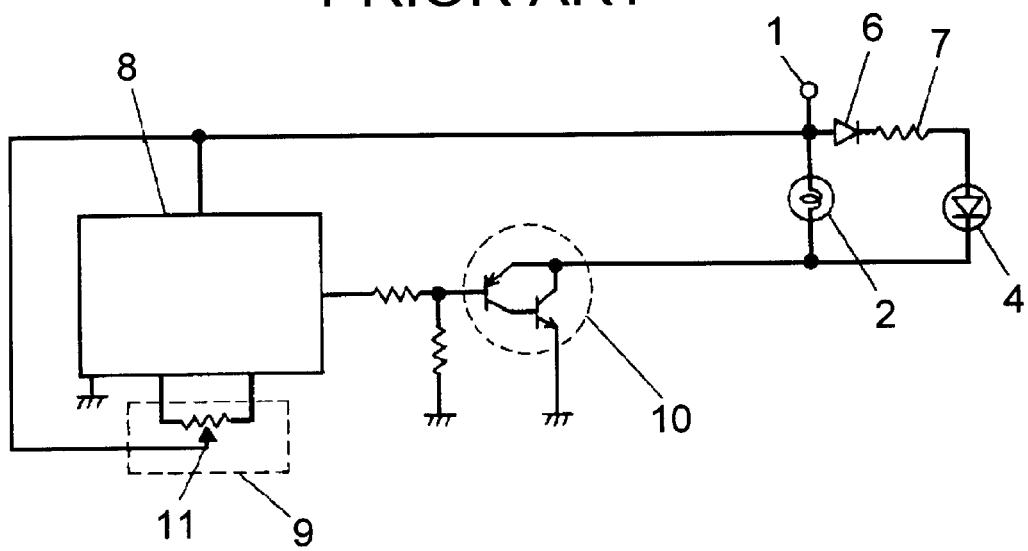
FIG. 8 shows a circuit diagram of a conventional light-controlling device used for a vehicle.

FIG. 5 shows a circuit diagram of a light-controlling device used for a vehicle in accordance with the second exemplary embodiment of the present invention. FIG. 6 shows a plan view of an essential part of the light-controlling device in accordance with the second embodiment of the invention. FIG. 7 shows a longitudinal sectional view of an essential part of the light-controlling device of FIG. 6 taken along the line VII—VII in accordance with the second embodiment of the present invention.

In the second embodiment, detecting switch 19 disposed near variable resistor 9, and detecting parts 11A formed at operating section 11 of variable resistor 9 are not needed, which is different from the first embodiment. Fan shaped insulating section 29B is formed near an end of resistor section 29A, which changes an output of variable resistor 29.

Controlling circuit 28 generates voltage waveforms. Besides, when sliding-contact point 30 comes into contact with insulating section 29B according to a rotating operation of operating section 11 of variable resistor 29, controlling circuit 28 turns incandescent lamp 2 and LED 4 off simultaneously based on a discontinuous change of an output of variable resistor 29.

As discussed above, the light-controlling device of this invention includes controlling circuit 28 having a function for turning a plurality of light-emitting sections such as incandescent lamp 2 or LED 4 off simultaneously, where the plurality of light-emitting sections have minimum voltages different from each other at predetermined illumination. When illumination of the plurality of light-emitting sections decreases to the predetermined illumination by rotating section 11 of variable resistor 29, controlling circuit 28 turns the light-emitting sections off simultaneously based on a discontinuous change of an output of variable resistor 29.

Because indicator 3 illuminated by lamp 2 and meter 5 illuminated by LED 4 can be turned off simultaneously using the structure mentioned above, an operator does not feel a sense of incongruity.

Variable resistors, which are operated by rotating, are described in the first and second embodiments, however, a variable resistor which is operated by sliding can be also used.

The present invention can provide a light-controlling device having a function for turning a plurality of light-emitting sections such as an incandescent lamp or an LED off simultaneously, where the plurality of light-emitting sections have minimum voltages different from each other at predetermined illumination.

What is claimed is:

1. A light-controlling device used for a vehicle comprising:

(a) a controlling circuit coupled with a plurality of light-emitting sections, which have minimum voltages different from each other at predetermined illumination; and (b) a variable resistor for changing illumination of the plurality of light-emitting sections by changing an electric output of said controlling circuit, wherein when the illumination of the plurality of light-emitting sections decreases to the predetermined illumination, using said variable resistor, said controlling circuit turns the plurality of light-emitting sections off simultaneously based on a signal from a detecting section which is linked with said variable resistor.

2. The light-controlling device used for a vehicle of claim 1 further comprising:

(f) a detecting switch formed near said variable resistor; and (g) a detecting part, which is formed at a predetermined position of an operating section of said variable resistor, for operating said detecting switch, wherein said detecting switch and said detecting part form the detecting section.

3. A light-controlling device used for a vehicle comprising:

(a) a controlling circuit coupled with a plurality of light-emitting sections, which have minimum voltages different from each other at predetermined illumination; and (b) a variable resistor for changing illumination of the plurality of light-emitting sections by changing an electric output of said controlling circuit, wherein when the illumination of the plurality of light-emitting sections decreases to the predetermined illumination using said variable resistor, said controlling circuit turns the plurality of light-emitting sections off simultaneously based on a discontinuous change of an output of said variable resistor by bringing a sliding-contact point of said variable resistor contact with an insulating section, which is formed near an end of a resistor section of said variable resistor.

* * * * *